(12) United States Patent
Tamaoka et al.

(10) Patent No.: US 7,593,182 B2
(45) Date of Patent: Sep. 22, 2009

(54) RECORDING DISK DRIVING DEVICE MOTOR UNIT HAVING A SHEET MEMBER ATTACHED TO A BASE

(75) Inventors: Takehito Tamaoka, Kyoto (JP); Hiroomi Ogawa, Ichinomiya (JP)

(73) Assignee: Nidec Corporation, Kyoto (JP)

( * ) Notice: Subject to any disclaimer, the term of this patent is extended or adjusted under 35 U.S.C. 154(b) by 341 days.

(21) Appl. No.: 11/307,815

(22) Filed: Feb. 24, 2006

(65) Prior Publication Data

US 2006/0221495 A1 Oct. 5, 2006

(30) Foreign Application Priority Data

Feb. 25, 2005 (JP) .............. 2005-050643

(51) Int. Cl.
G11B 17/02 (2006.01)
H02K 21/02 (2006.01)
(52) U.S. Cl. ................................. 360/99.08
(58) Field of Classification Search .............. 360/98.07, 360/99.04, 99.08, 99.11; 310/71, 90, 67 R
See application file for complete search history.

(56) References Cited

U.S. PATENT DOCUMENTS

| | | | |
|---|---|---|---|
| 5,623,392 A | | 4/1997 | Ma |
| 5,723,927 A * | 3/1998 | Teshima | ........................ 310/90 |
| 6,204,996 B1 * | 3/2001 | MacLeod | .................. 360/99.08 |
| 6,208,050 B1 | 3/2001 | Fujii et al. | |
| 6,316,855 B1 * | 11/2001 | Moosmann et al. | ............ 310/71 |
| 6,815,854 B2 * | 11/2004 | Kull | ............................. 310/90 |
| 6,979,923 B2 * | 12/2005 | Nishio | ......................... 310/90 |
| 7,031,104 B1 | 4/2006 | Butt et al. | |
| 7,246,440 B2 * | 7/2007 | Obara et al. | ................ 29/898.1 |
| 2004/0252409 A1 * | 12/2004 | Fu et al. | ................... 360/99.08 |
| 2005/0047002 A1 * | 3/2005 | Fu et al. | ................... 360/98.07 |
| 2005/0057848 A1 | 3/2005 | Okasaka et al. | |
| 2005/0140220 A1 * | 6/2005 | Tsuda et al. | .............. 310/67 R |
| 2005/0286167 A1 * | 12/2005 | Yonei et al. | .............. 360/99.08 |

FOREIGN PATENT DOCUMENTS

| | | |
|---|---|---|
| JP | H11-196557 A | 7/1999 |
| JP | H11-275782 A | 10/1999 |
| JP | 06-223494 | 8/2004 |
| JP | 2005-127510 A | 5/2005 |
| WO | WO2005/122171 A1 | 12/2005 |

* cited by examiner

*Primary Examiner*—Jefferson Evans
(74) *Attorney, Agent, or Firm*—Volentine & Whitt, PLLC

(57) ABSTRACT

In a motor of a motor unit, a base plate includes a raised portion protruding from a surrounding portion on a side of the stator portion opposite to a rotor portion. A raised face of the raised portion is perpendicular to a central axis and is formed in an annular shape around the central axis. The raised face of the raised portion protrudes lower than a lower surface of a sticker member stuck around the raised portion to thereby close a hole portion formed around the raised portion.

22 Claims, 13 Drawing Sheets

RECORDING DISK DRIVING DEVICE MOTOR UNIT HAVING A SHEET MEMBER ATTACHED TO A BASE

BACKGROUND OF THE INVENTION

1. Field of the Invention

The present invention relates to a motor unit including an electric motor, and to a recording disk driving device including the motor unit.

2. Background Art

Conventionally, a recording disk driving device such as a hard disk device includes a spindle motor (hereafter referred to as "motor") for rotationally driving a recording disk. As a result of miniaturization of the recording disk driving device in recent years, the motor as a driving source is required to be miniaturized and thinner. In such a motor, a sheet-shaped member, such as a flexible printed circuit board (hereafter referred to as "FPC") or a name plate, is stuck on an outer face of the motor (i.e., the face of the base portion opposite a side to which a stator is mounted).

When the recording disk is mounted to the motor, the recording disk is normally placed on a rotor hub of the motor placed on a jig and the recording disk is screwed onto the rotor hub by a clamp member. At this time, a downward load is applied on the rotor hub and a bearing of the motor is pressed toward a surface of the jig.

In the case in which the FPC is annular and is stuck to the bottom face of the motor, the FPC is mainly abutted against the jig when the motor is placed on the jig. As a result, that part of the base portion provided with the bearing is positioned above the surface of the jig (See FIG. 7).

If the recording disk is mounted to such a motor, the portion of the base portion provided with the bearing is deformed due to the load applied to the rotor hub. In other words, the portion of the base portion provided with the bearing may bend downward in some cases. As a result, a height of the rotor hub from the base portion and parallelism between them may change, and a relative position of the recording disk with respect to a magnetic head may be displaced in some cases.

In a small motor, it is not easy to stick the FPC onto a predetermined position of the bottom face of the base portion. Therefore, it is required that positioning is carried out easily in sticking of the FPC to enhance efficiency of sticking operation.

BRIEF SUMMARY OF THE INVENTION

In a motor unit which is an example of the present invention and includes an electric motor, the unit comprises a motor having a rotor portion rotating around a central axis through a bearing mechanism with respect to a stationary portion and a housing member which is at least a part of a housing and houses a recording disk in its inner space.

The rotor portion includes a rotor hub having a disk mounting portion on which the recording disk is placed and a rotor magnet mounted to the rotor hub. The stationary portion includes a stator and a base portion having a sheet-shaped member stuck to its lower face. The stator is mounted on the base portion, and the base portion forms at least a part of the housing member.

The base portion or a member fixed to a central position of the base portion has a raised portion having a circular or annular flat face around the central axis or three or more flat faces arranged in a circumferential direction around the central axis, the face(s) perpendicular to the central axis, on an axially lower side of the stationary portion.

The flat face(s) of the raised portion(s) is positioned in substantially the same plane as a lower face of the sheet-shaped member or the plane raised from the lower face of the sheet-shaped member.

In the invention, it is possible to easily perform positioning of the sheet-shaped member in sticking. Therefore, it is possible to increase efficiency of sticking operation.

Moreover, deformation of the base portion in mounting of the recording disk can be suppressed. Furthermore, it is possible to make the motor unit thin. Also, in the bearing mechanism utilizing fluid dynamic pressure, it is possible to increase bearing rigidity in a radial direction.

In the description of the invention, words such as upper, lower, left, and right for explaining positional relationships between respective members and directions merely indicate positional relationships and directions in the drawings and might not indicate positional relationships and directions of the members when in use in an actual device.

DETAILED DESCRIPTION OF THE INVENTION

Embodiments of the present invention will be described below by reference to FIGS. 1 to 13.

First Embodiment

Figure 1:
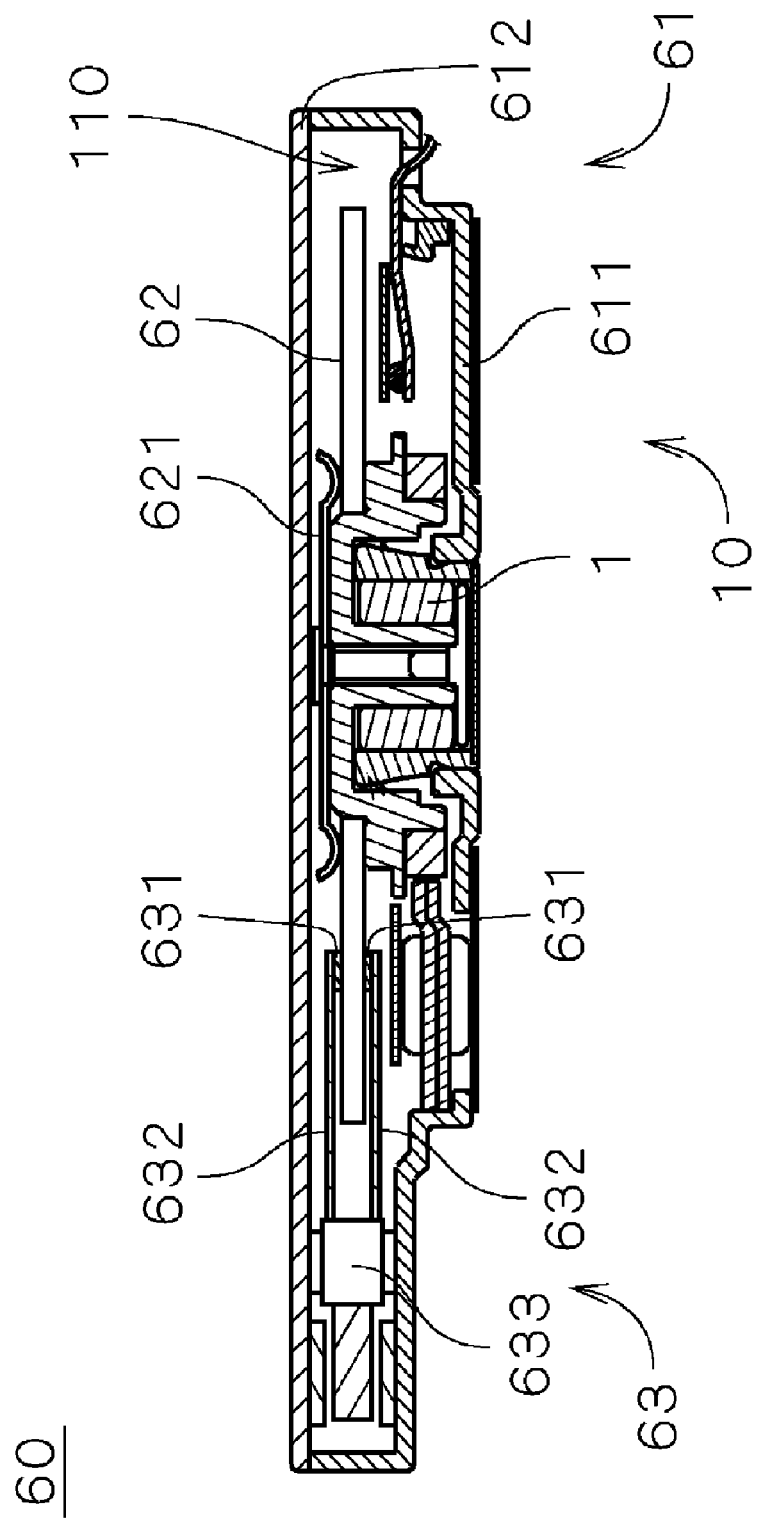
FIG. 1 is a drawing showing an internal structure of a recording disk driving device according to a first embodiment.

FIG. 1 is a drawing showing an internal structure of a recording disk driving device 60 including an electric spindle motor 1 (hereafter referred to as "motor 1") according to a first embodiment of the invention. The recording disk driving device 60 is a hard disk device and includes: a disk-shaped recording disk 62 on which information is recorded; an access portion 63 for writing and/or reading information in and out of the recording disk 62; the electric motor 1 for retaining and rotating the recording disk 62; and a housing 61 for housing the recording disk 62, the access portion 63, and the motor 1 in an internal space 110.

As shown in FIG. 1, the housing 61 includes a first housing member 611 and a plate-shaped second housing member 612. The first housing member 611 has an opening at its upper portion and an inner bottom face, and the motor 1 and the access portion 63 are mounted to the inner bottom face. The second housing member covers the opening of the first housing member 611 to thereby form the internal space 110. In the recording disk driving device 60, the second housing member 612 is joined to the first housing member 611 to form the housing 61. The hermetically sealed internal space 110 in the housing 61 is a clean space with extremely little dust and dirt.

The recording disk 62 is placed on an upper side of the motor 1 and is fixed to the motor 1 by a clamper 621. The access portion 63 includes a head 631 adjacent to the recording disk 62 for magnetically writing in and reading out information, an arm 632 for supporting the head 631, and a head moving mechanism 633 for moving the arm 632 to thereby change relative positions of the head 631 and the recording disk 62. With these structures, the head 631 gets access to a required position of the recording disk 62 while being adjacent to the rotating recording disk 62 to write in and read out information.

In the recording disk driving device 60, the motor 1 used for rotating the recording disk 62 and the first housing member 611 mounted with the motor 1 compose a motor unit 10 which is a semi manufactured product.

Figure 2:
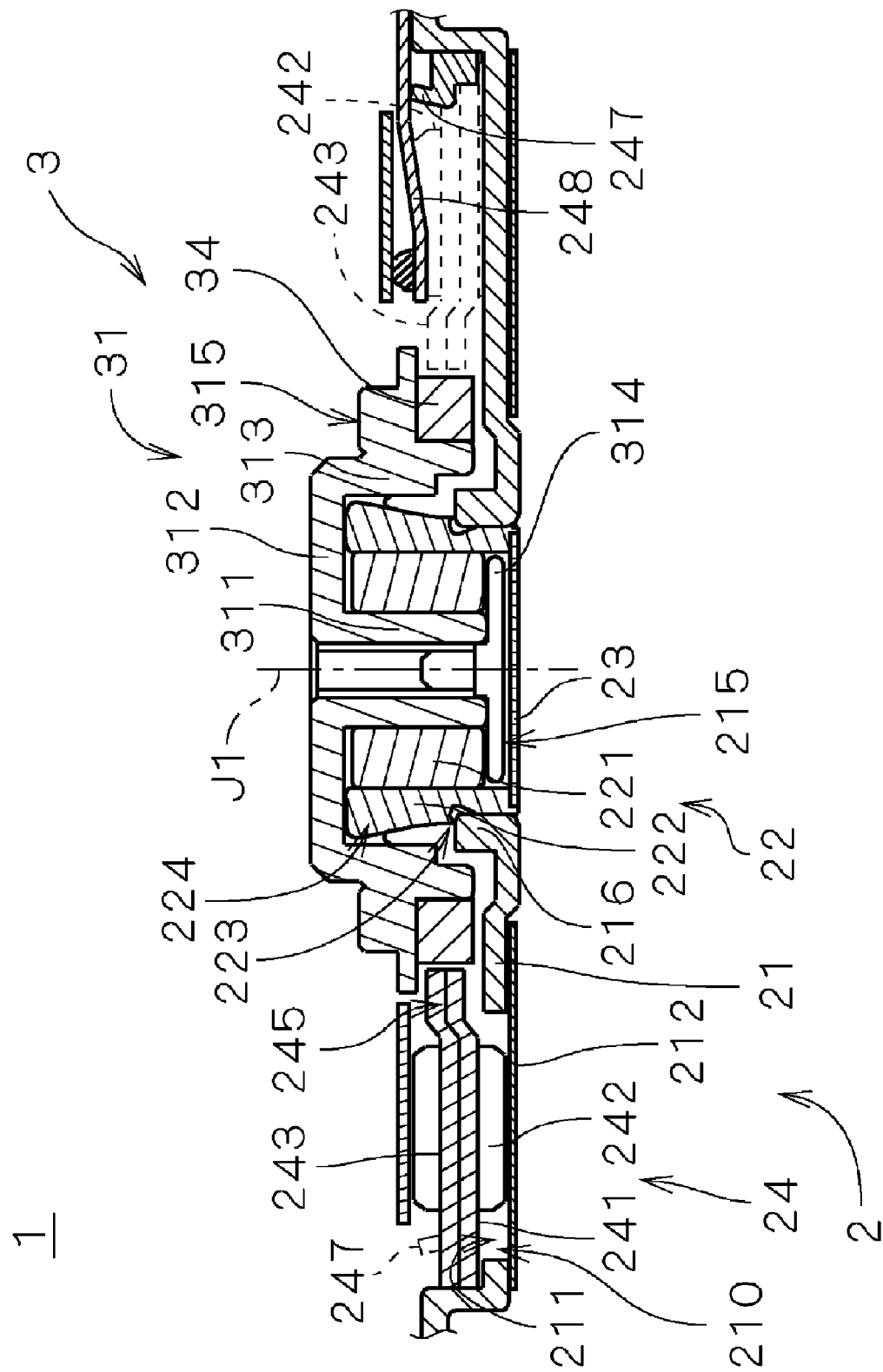
FIG. 2 is a vertical sectional view showing a structure of a motor.

FIG. 2 is a vertical sectional view showing a structure of the motor 1 for driving the disk. FIG. 2 shows a section along a plane including a central axis J1 of the motor 1 with a part of a structure positioned behind the section illustrated in broken lines.

As shown in FIG. 2, the motor 1 includes a stationary portion 2 and a rotor portion 3. The rotor portion 3 is rotatably supported around the central axis J1 with respect to the stationary portion 2 through a bearing mechanism utilizing fluid dynamic pressure by lubricating oil. In the following description, a rotor portion 3 side will be described as an upper side and a stationary portion 2 side will be described as a lower side along the central axis J1 for the sake of convenience. However, the central axis J1 does not necessarily have to agree with a direction of gravity.

The rotor portion 3 includes a rotor hub 31 for retaining respective portions of the rotor portion 3 and a rotor magnet 34 mounted to the rotor hub 31 and disposed around the central axis J1. The rotor hub 31 is made of stainless steel or the like and in a substantially cylindrical shape around the central axis J1. The rotor hub 31 includes a shaft 311 protruding downward (i.e., toward the stationary portion 2) and a disk portion 312 in a substantially disk shape widening perpendicularly to the central axis J1 from an upper end portion of the shaft 311. The rotor hub 31 also includes a cylinder portion 313 in a substantially cylindrical shape protruding downward at an outer edge of the disk portion 312 and a substantially annular disk mounting portion 315 on which the recording disk 62 is to be placed at an outer periphery of the cylinder portion 313. To a lower tip end portion of the shaft 311, a substantially disk-shaped thrust plate 314 is mounted.

The stationary portion 2 includes a base plate 21 which is a base portion for retaining respective portions of the stationary portion 2 and a substantially cylindrical sleeve unit 22 which is a part of a bearing mechanism for supporting the rotor portion 3 for rotation. The stationary portion 2 also includes a stator 24 mounted to the base plate 21 around the sleeve unit 22 to generate a rotating force (torque) around the central axis J1 between the base plate 21 and the rotor magnet 34.

The base plate 21 is a part of a first housing member 611 (see FIG. 1) and is integrally formed with other portions of the first housing member 611 by pressing a plate-shaped member made of aluminum, an aluminum alloy, or magnetic or non-magnetic iron. In other words, in the motor unit 10, the base plate 21 is shared by the motor 1 and the first housing member 611.

The stator 24 is mounted to the base plate 21 from above by press fitting or bonding and includes a core 241 formed by laminating two silicon steel sheets and a plurality of coils 242 provided to predetermined portions of the core 241. A thickness of each of the silicon steel plates forming the core 241 is 0.1 to 0.35 mm and is preferably 0.2 mm.

Figure 3:
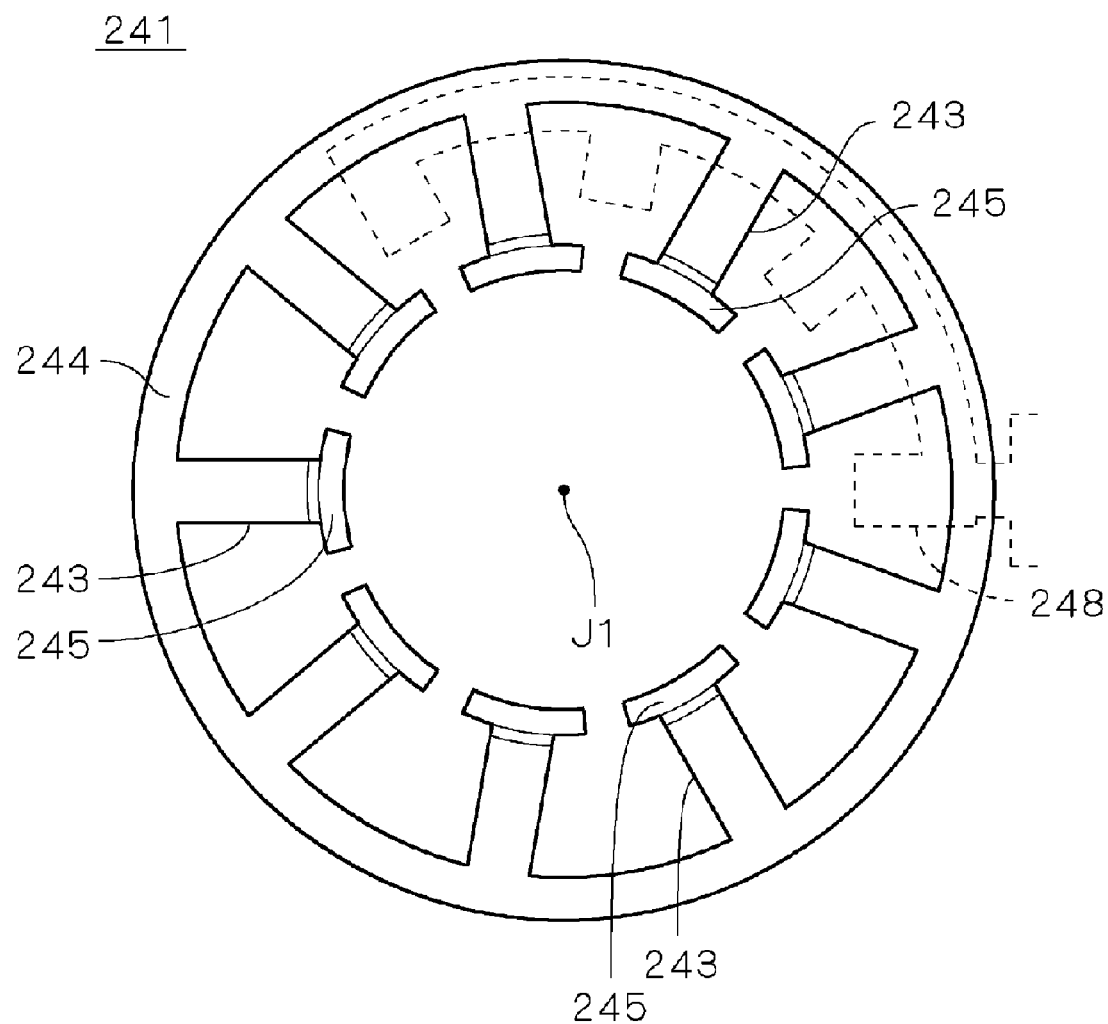
FIG. 3 is a plan view showing a core.

FIG. 3 is a plan view of the core 241. As shown in FIG. 3, the core 241 includes a plurality of (nine in the embodiment) teeth 243 disposed radially around the central axis J1 and an annular support ring 244 for supporting the plurality of teeth 243 from an outer periphery side of the plurality of teeth 243. The support ring 244 connects and supports end portions of the respective teeth 243 on further sides from the central axis J1. Portions corresponding to the plurality of teeth 243 and the supporting ring 244 respectively are formed integrally with the silicon steel sheets forming the core 241. Therefore, the plurality of teeth 243 and the support ring 244 are magnetically connected.

Each of the teeth 243 includes a magnet facing portion 245 widening in a circumferential direction around the central axis J1 at an end portion on the central axis J1 side (i.e., an end portion opposite to the support ring 244). As shown in FIG. 2, in the motor 1, each of the teeth 243 is bent upward on the central axis J1 side, and the magnet facing portion 245 faces an outer peripheral face of the rotor magnet 34 to thereby efficiently generate torque between the stator 24 an the rotor magnet 34.

The coil 242 is formed by winding a conductor around each of the teeth 243 in two layers and a diameter of the conductor is 0.05 to 0.3 mm (more ideally, 0.1 mm). The conductor from each of the coils 242 is led through a raised portion 247 formed between adjacent teeth 243 to lock a bridging wire to a printed circuit board 248 shown in FIGS. 2 and 3. Then the conductor is joined to an electrode of the printed circuit board 248 by soldering. In FIG. 3, the printed circuit board 248 is illustrated in a broken line.

Figure 4:
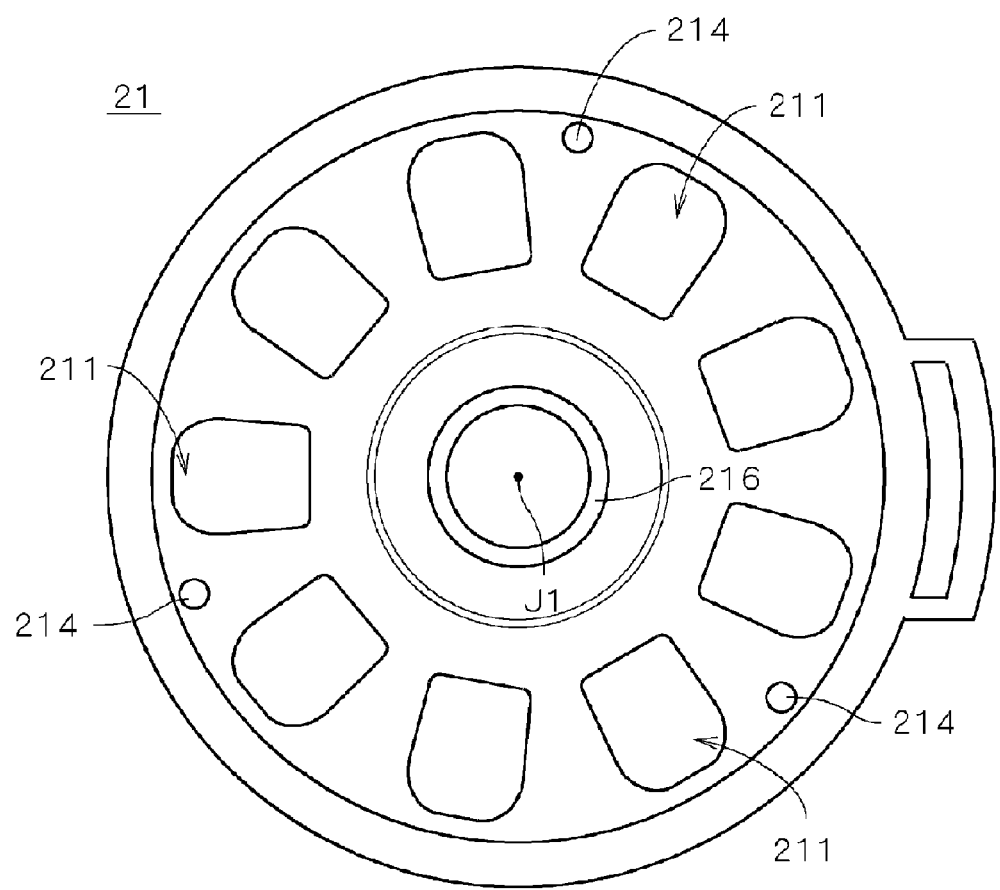
FIG. 4 is a plan view showing a base plate.

FIG. 4 is a plan view of the base plate 21. As shown in FIG. 4, the base plate 21 is a substantially disk-shaped member and includes three stator support portions 214 protruding upward from an upper face of the base plate 21. The stator support portions 214 are arranged at regular intervals around the central axis J1 and contact the support ring 244 (see FIG. 3) of the stator 24 mounted to the base plate 21 to support the stator 24 from below. The three stator support portions 214 are formed along with the base plate 21 by presswork.

At a central portion of the base plate 21, as shown in FIGS. 2 and 4, a substantially cylindrical sleeve mounting portion 216 protruding upward toward the rotor portion 3 around the central axis J1 is provided. As shown in FIG. 2, the sleeve unit 22 includes a substantially cylindrical sleeve 221 into which the shaft 311 is inserted and a substantially cylindrical sleeve housing 222 fixed through an adhesive or the like to an outer periphery of the sleeve 221. The sleeve unit 22 is inserted into the sleeve mounting portion 216 and mounted to the base plate 21.

A flange portion 224 which is a raised portion protruding outward with respect to the central axis J1 along an outer periphery of the sleeve unit 22 is formed integrally with an upper portion of the sleeve housing 222. In mounting the sleeve unit 22, a portion 223 of the flange portion 224 on the base plate 21 side and a tip end of the sleeve mounting portion 216 of the base plate 21 are engaged with each other in a vertical direction. An opening on a lower end side of the sleeve unit 22 is closed with a substantially disk-shaped seal cap 23. Thus, an opening 215 on a lower side of the sleeve mounting portion 216 of the base plate 21 is closed with the sleeve housing 222 and the seal cap 23.

As shown in FIG. 4, in areas of the base plate 21 corresponding to the plurality of teeth 243 (see FIG. 2) around the sleeve mounting portion 216, a plurality of (nine in the embodiment) hole portions 211 penetrating the base plate 21 in a vertical direction are formed. A thickness of the base plate 21 at the sleeve mounting portion 216 and around the hole portions 211 is preferably 0.1 mm or greater from a viewpoint of prevention of deformation of the base plate 21 due to a load in mounting of the recording disk 62 and vibration or the like in driving of the motor 1. The thickness is preferably 1.5 mm or smaller from a viewpoint of making the motor 1 thin. The thickness of the base plate 21 is more desirably 0.3 mm to 0.8 mm and is 0.4 mm in the embodiment.

As shown in FIG. 2, in a state that the stator 24 is mounted to the base plate 21, lower portions of the coils 242 provided to the corresponding teeth 243 are inserted into the respective hole portions 211 in the base plate 21. Lower faces of the coils 242 are positioned between upper and lower principal surfaces of the base plate 21 in the direction of the central axis J1. In other words, portions of the respective plurality of coils 242 are housed in the corresponding hole portions 211 in the base plate 21 without protruding lower than a lower face of the base plate 21. In the stationary portion 2, an adhesive 210 is filled in each of the hole portions 211 into which the coils 242 are inserted, the coils 242 are fixed, and the hole portions 211 are sealed. In FIG. 2, illustration of the adhesive 210 is omitted so as to facilitate understanding of the drawing and only the reference numeral is provided to a position where the adhesive 210 is filled.

The housing member includes a sticker member 212 in sheet form (e.g., an FPC or a name plate) for closing the plurality of hole portions 211 from a lower side of the base plate 21. The sticker member 212 is an annular member which extends around the central axis J1 and is stuck onto the lower main face of the base plate 21 through a tackiness agent layer (or an adhesive layer). In the embodiment, the sum of a thickness of the sticker member 21 and a thickness of the tackiness agent layer is about 70 μm.

Figure 5:
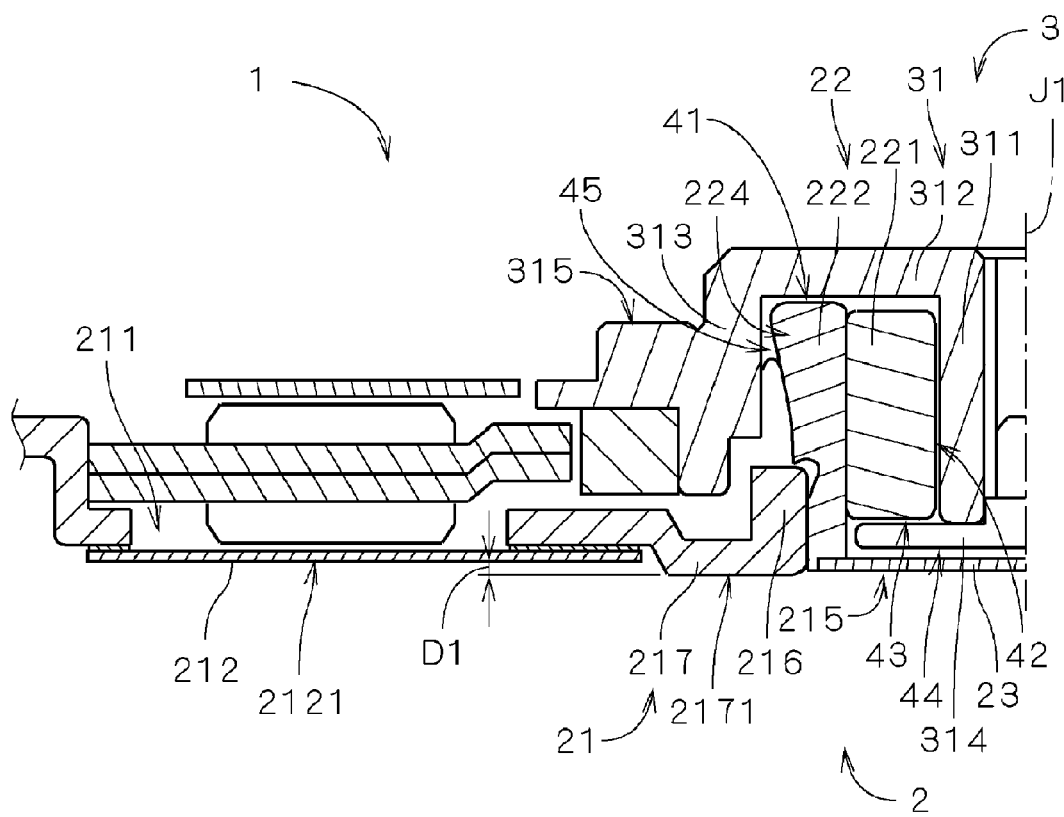
FIG. 5 is an enlarged view showing a portion of the motor.

FIG. 5 is an enlarged vertical sectional view of a portion (a left half of FIG. 2) of the motor 1. As shown in FIG. 5, the base plate 21 includes a raised portion 217. The raised portion 217 is composed of a part of the base plate 21 protruding downwardly at an outer periphery of the opening 215. A flat face (hereafter referred to as "raised face") 2171 on a lower side of the raised portion 217 is perpendicular to the central axis J1 and is formed in an annular shape around the central axis J1. In the base plate 21, the raised portion 217 is formed at a certain position of the lower end portion of the sleeve mounting portion 216 so that the raised portion 217 forms the opening 215.

As shown in FIG. 5, the raised face 2171 of the raised portion 217 protrudes lower than a lower surface 2121 of the sticker member 212 which is stuck around the raised portion 217 to thereby close the hole portions 211 formed around the raised portion 217. A distance D1 for which the raised portion 217 protrudes from the surface 2121 of the sticker member 212 in the direction of the central axis J1 is preferably 10 μm or shorter from a viewpoint of making the motor 1 thin. In FIG. 5, a protruding amount of the raised portion 217 is exaggerated as compared with an actual amount (ditto for FIGS. 9 and 10).

Next, a bearing mechanism utilizing fluid dynamic pressure for supporting the rotor portion 3 of the motor 1 for rotation on the stationary portion 2 will be described. As shown in FIG. 5, in the motor 1, minute gaps are formed between a lower face of the disk portion 312 of the rotor hub 31 and an upper end face of the sleeve housing 222, between an inner peripheral face of the sleeve 221 and an outer peripheral face of the shaft 311, between a lower end face of the sleeve 221 and an upper face of the thrust plate 314, between a lower face of the thrust plate 314 and an upper face of the seal cap 23, and between an outer peripheral face of the flange portion 224 of the sleeve housing 222 and an inner peripheral face of the cylinder portion 313 of the rotor hub 31. Hereafter, these gaps are referred to as "an upper gap 41," "a side gap 42," "a first lower gap 43," "a second lower gap 44," and "an outer gap 45," respectively. Lubricating oil is filled without voids in these gaps.

An outer peripheral face of the flange portion 224 of the sleeve housing 222 is a slope with its outside diameter gradually decreasing downward and an inside diameter of the inner peripheral face of the cylinder portion 313 of the rotor hub 31 facing the outer peripheral face of the flange portion 224 is constant. In this way, an interface of the lubricating oil in the outer gap 45 is in a meniscus shape by capillary action and surface tension to form a taper seal. The outer gap 45 functions as an oil buffer to prevent flowing out of the lubricating oil.

In the upper end face of the sleeve housing 222 and the lower end face of the sleeve 221, grooves (e.g., spiral grooves) for generating pressure toward the central axis J1 in the lubricating oil in rotation of the rotor portion 3 are formed. The upper gap 41 and the first lower gap 43 form a thrust dynamic pressure bearing portion.

In opposed faces of the side gap 42, grooves (e.g., herringbone grooves or the like provided in upper and lower portions of the inner peripheral face of the sleeve 221 in a direction in which the central axis J1 faces) for generating fluid dynamic pressure in the lubricating oil are formed. The side gap 42 forms a radial dynamic pressure bearing portion.

In the motor 1, by supporting the rotor portion 3 by a bearing mechanism utilizing fluid dynamic pressure without contact through the lubricating oil, it is possible to rotate the rotor portion 3 with high accuracy and with a low noise level. Especially, in the bearing mechanism of the embodiment, abnormal contact between the shaft 311 and the sleeve 221 caused by air bubbles generated in the lubricating oil, leakage of the lubricating oil due to expansion of air inside the bearing, and the like can further be suppressed.

As described above, in the motor 1, the lubricating oil which is fluid is filled in the gaps (i.e., the upper gap 41, the side gap 42, the first lower gap 43, the second lower gap 44, and the outer gap 45) formed between the sleeve unit 22 (i.e., the sleeve 221 and the sleeve housing 222), the rotor hub 31, and the seal cap 23. In rotation of the rotor portion 3, the rotor portion 3 is supported by utilizing the fluid dynamic pressure by the lubricating oil. By driving of the rotor portion 3 for rotation about the central axis J1 and with respect to the stationary portion 2, the recording disk 62 (see FIG. 1) mounted to the rotor portion 3 is driven for rotation.

When the recording disk 62 is mounted to the motor unit 10, the motor unit 10 is retained on a mounting jig with a lower face of the motor unit 10 in contact with a placing face of the mounting jig. Then, the recording disk 62 is pressed against the disk mounting portion 315 of the rotor hub 31.

The raised face 2171 of the base plate 21 protrudes lower than the surface 2121 of the sticker member 212 stuck around the raised portion 217. Therefore, the raised face 2171 of the raised portion 217 comes in contact with the placing face of the mounting jig. In this way, a downward load applied to the sleeve mounting portion 216 through the rotor hub 31 and the sleeve unit 22 in mounting of the recording disk 62 is supported by the whole raised face 2171.

Therefore, it is possible to prevent the base plate 21 from bending down when an excessive force is applied in a vicinity of the sleeve mounting portion 216. In this manner, in mounting of the recording disk 62, deformation of the base plate 21 in the vicinity of the sleeve mounting portion 216 can be suppressed and displacement of the disk mounting portion 315 of the rotor hub 31 from a predetermined position can be suppressed.

Even when the raised face 2171 of the raised portion 217 is positioned in the same plane as the surface 2121 of the sticker member 212 (i.e., the distance D1 shown in FIG. 5 is about 0 µm), it is the raised face 2171 that mainly comes in contact with the placing face of the mounting jig. Therefore, deformation of the base plate 21 in mounting of the recording disk 62 can be suppressed.

Because the above structure in which deformation of the base plate 21 can be suppressed as described above includes the sleeve mounting portion 216, the structure is especially suitable to the motor unit 10 in which the load is likely to be applied on the base plate 21 in mounting of the recording disk 62. The structure is especially suitable to the motor unit 10 in which the base plate 21 is thin with a thickness of 0.1 mm to 1.5 mm and is likely to be deformed even by a small load (e.g., a small motor unit for a 1-inch or smaller recording disk 62).

Figure 6:
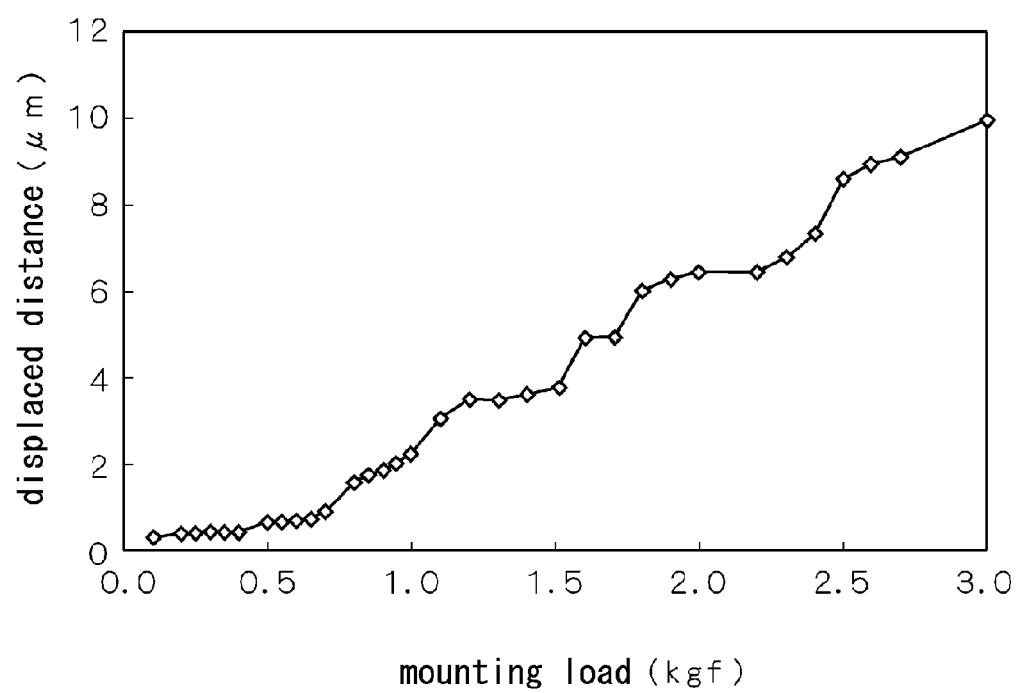
FIG. 6 is a drawing showing a relationship between a load applied to a rotor hub and a displaced amount of a disk mounting portion.
Figure 7:
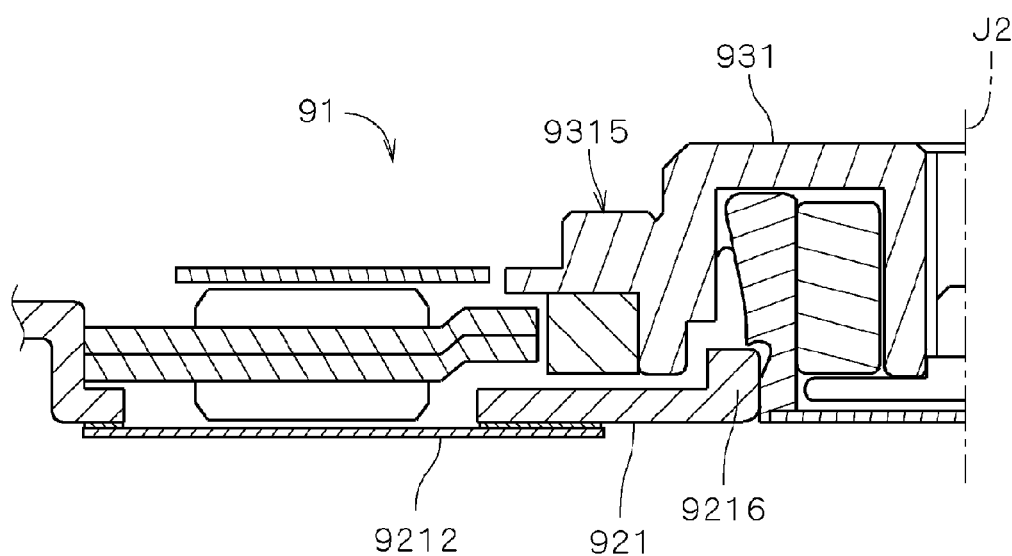
FIG. 7 is an enlarged view showing a portion of a motor of a comparison example.
Figure 8:
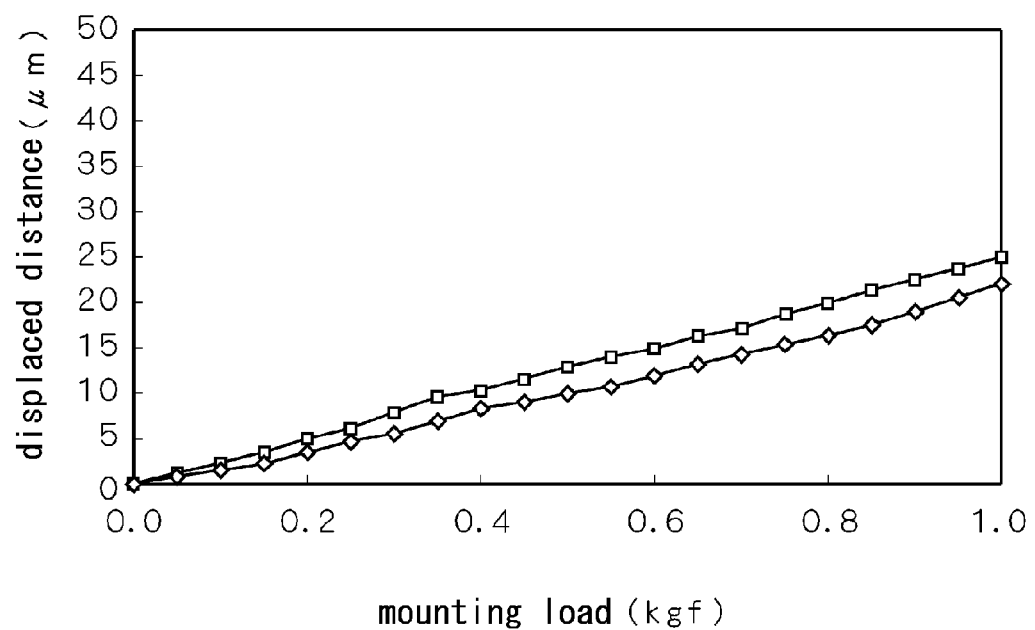
FIG. 8 is a drawing showing relationships between a load applied to a rotor hub and a displaced amount of a disk mounting portion.

FIG. 6 shows a relationship between a load applied to the rotor hub 31 in mounting the recording disk 62 and a displaced amount of the disk mounting portion 315 in the direction of the central axis J1. FIG. 7 is a vertical sectional view showing a portion of the motor 91 of the motor unit in which a base plate 921 is not provided with a raised portion as a comparison example. FIG. 8 is a drawing showing comparison examples of relationships each between a load applied to a rotor hub 931 in mounting a recording disk and a displaced amount of a disk mounting portion 9315 in a direction of a central axis J2 in the motor units of the comparison examples. With regard to the displaced amounts of the disk mounting portions shown in FIGS. 6 and 8, downward displacement is represented as a plus. FIG. 8 shows the displaced amounts of the disk mounting portions 9315 measured in the motor units of the two comparison examples.

As shown in FIG. 7, in the motor unit of the comparison example, the base plate 921 is not provided with the raised portion. An annular sticker member 9212 only comes in contact with the placing face of the mounting jig, and a portion of the base plate 921 in a vicinity of a sleeve mounting portion 9216 is positioned above and away from the placing face. Therefore, in mounting the recording disk, an excessive force is applied onto the portion in the vicinity of the sleeve mounting portion 9216, the portion of the base plate 921 in the vicinity of the sleeve mounting portion 9216 bends downward, and the disk mounting portion 9315 of the rotor hub 931 is displaced downward. As shown in FIG. 8, if a mounting load is 1 kgf, for example, the displaced amount of the disk mounting portion 9315 is about 22 to 25 µm.

On the other hand, in the motor unit 10 according to the embodiment, as shown in FIG. 6, the displaced amount of the disk mounting portion 315 of the rotor hub 31 is extremely small, about 2 µm when the mounting load is 1 kgf and about 10 µm when the mounting load is 3 kgf. In the motor unit 10, deformation of the base plate 21 can be suppressed and displacement of the disk mounting portion 315 can be suppressed while the recording disk 62 is being mounted to the motor 1. Therefore, it is possible to prevent the recording disk 62 from deviating from its desired axial position relative to the access portion 63, i.e., the recording disk 62 can be mounted to the motor 1 of the motor unit 10 with positional accuracy.

In the motor unit 10, the raised portion 217 protruding from surrounding portions is provided at the central portion of the base plate 21. Positioning of the sticker member 212 can be performed easily with reference to the raised portion 217 and therefore the sticker member 212 can easily be stuck to the base plate 21. As a result, manufacturing of the motor unit 10 can be simplified to increase productivity.

In the motor unit 10, because the sticker member 212 is formed in the annular shape, it is possible to easily stick the sticker member 212 to the base plate 21 as compared with sticking of a plurality of split sticker members. Moreover, positioning with reference to the raised portion 217 can be performed more easily. Especially when the hole portions 211 are provided in the base plate 21, it is possible to easily seal the hole portions 211.

In the motor unit 10, the motor unit 10 can be made thin by forming the hole portions 211 in the base plate 21, and housing parts of the coils 242 in the hole portions 211. As described already, from a viewpoint of making the motor unit 10 thin, the distance D1 for which the raised portion 217 protrudes from the surface 2121 of the sticker member 212 in the direction of the central axis J1 is preferably 10 µm or shorter.

In the motor unit 10, because the raised portion 217 is provided at the central portion (i.e., below the bearing mechanism) of the base plate 21, a length of the bearing mechanism (i.e., the shaft 311 and the sleeve unit 22) in the direction of the central axis J1 can be increased while preventing deformation of the portion of the base plate 21 in the vicinity of the sleeve mounting portion 216. In this way, in the bearing mechanism utilizing fluid dynamic pressure, an effective length (or a bearing span) of the radial dynamic pressure bearing portion (i.e., the side gap 42) can be increased to enhance bearing rigidity in the radial direction. Thus, the motor unit 10 is especially suitable to the motor unit including the bearing mechanism utilizing the fluid dynamic pressure.

Second Embodiment

Figure 9:
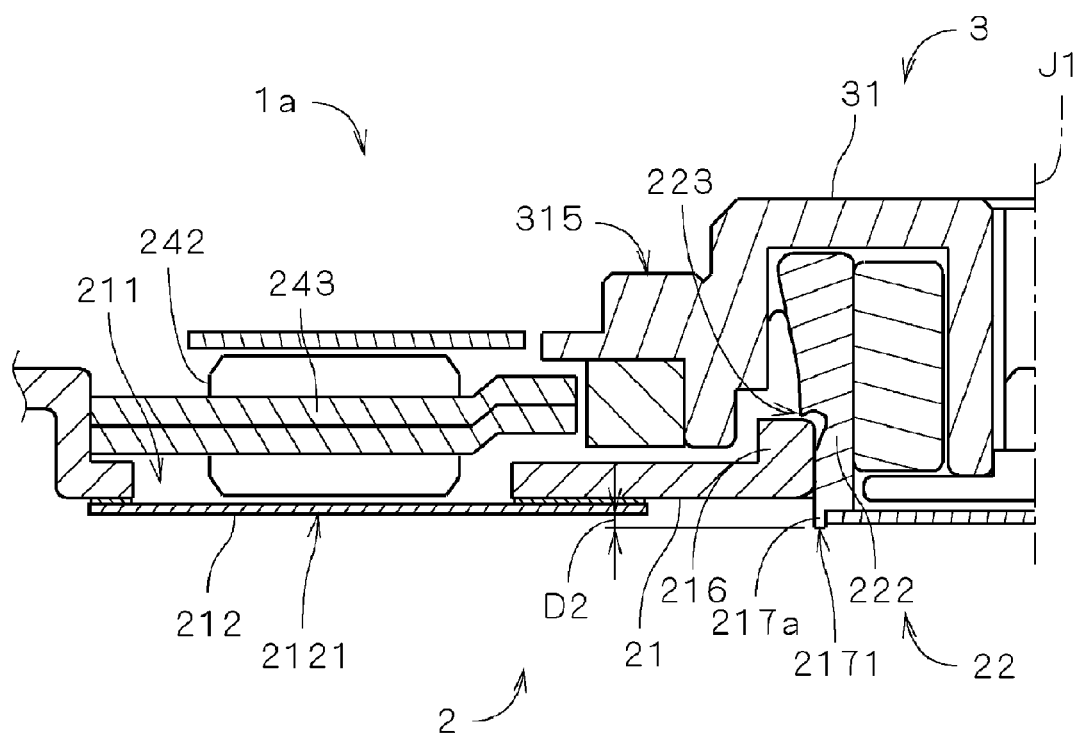
FIG. 9 is an enlarged view showing a portion of a motor according to a second embodiment.

Next, a motor unit according to a second embodiment of the invention will be described. FIG. 9 is an enlarged vertical sectional view of a part of a motor 1a of the motor unit according to the second embodiment. As shown in FIG. 9, in the motor 1a, a raised portion 217a provided to a lower side of the stationary portion 2 locates in a different position from that in the motor 1 shown in FIG. 5. Other structures are similar to those in FIGS. 2 to 5 and are provided with the same reference numerals in the following description.

In the motor 1a, a lower end portion of the sleeve unit 22 is formed as the raised portion 217a protruding from surrounding portions on the lower side of the stationary portion 2. In other words, the sleeve unit 22 which is a member fixed to a center position of the base plate 21 includes the raised portion 217a. A raised face 2171 of the raised portion 217a is perpendicular to the central axis J1 and is formed in an annular shape around the central axis J1.

As shown in FIG. 9, the raised face 2171 of the raised portion 217a protrudes lower than the surface 2121 of the annular sticker member 212 stuck around the raised portion 217a. A distance D2 for which the raised portion 217a protrudes from the surface 2121 of the sticker member 212 in the direction of the central axis J1 is preferably 10 µm or shorter in a viewpoint of making the motor 1a thin.

In the motor 1a, similarly to the first embodiment, when the sleeve unit 22 is inserted into the sleeve mounting portion 216 and mounted to the base plate 21, the flange portion 224 of the sleeve unit 22 is engaged with the tip end of the sleeve mounting portion 216. Around the sleeve mounting portion 216 of the base plate 21, hole portions 211 vertically penetrating the base plate 21 are formed in areas corresponding to the plurality of teeth 243. Portions of the coils 242 are housed in the hole portions 211 and the hole portions 211 are sealed with the adhesive. A thickness of the base plate 21 at the sleeve mounting portion 216 and around the hole portions 211 is 0.1 mm to 1.5 mm and more desirably, 0.3 mm to 0.8 mm. The bearing mechanism of the motor 1a utilizes the fluid dynamic pressure similarly to the first embodiment.

As described above, in the motor unit according to the second embodiment, the sleeve unit 22 of the motor 1a includes the raised portion 217a having the annular raised face 2171 around the central axis J1. The raised face 2171 protrudes lower than the surface 2121 of the sticker member 212 stuck around the raised portion 217.

Therefore, in mounting the recording disk to the rotor hub 31, the raised face 2171 of the raised portion 217a which is a part of the sleeve unit 22 comes in contact with the placing face of the mounting jig. In this way, a downward load applied to the rotor hub 31 in mounting of the recording disk is supported by the raised face 2171 of the sleeve unit 22. Therefore, it is possible to prevent application of the excessive force onto the portion of the base plate 21 in the vicinity of the sleeve mounting portion 216 and downward bending of the base plate 21.

As described above, in the motor unit according to the second embodiment, similarly to the first embodiment, deformation of the portion of the base plate 21 in the vicinity of the sleeve mounting portion 216 can be suppressed in mounting of the recording disk. Also, displacement of the disk mounting portion 315 of the rotor hub 31 from a predetermined position can be suppressed. As a result, it is possible to mount the recording disk to the motor unit with positional accuracy.

Even when the raised face 2171 of the raised portion 217a is positioned in the same plane as the surface 2121 of the sticker member 212, deformation of the portion of the base plate 21 in the vicinity of the sleeve mounting portion 216 in mounting of the recording disk can be suppressed (ditto for the following embodiments).

Similarly to the first embodiment, the structure according to the second embodiment is suitable to the motor unit including the sleeve mounting portion 216 and is especially suitable to the motor unit in which the base plate 21 is thin with a thickness of 0.1 mm to 1.5 mm and is likely to be deformed even by a small load.

In the motor unit according to the second embodiment, similarly to the first embodiment, the sticker member 212 can be easily positioned relative to the base plate 21 using the raised portion 217a as a guide when the sticker member 212 is to be adhered to the base plate 21. As a result, the productivity of the manufacturing of the motor unit can be increased.

Moreover, because the sticker member 212 is formed in the annular shape, it is possible to easily perform positioning of the sticker member 212 in sticking and sticking of the sticker member 212 to the base plate 21. When the hole portions 211 are provided in the base plate 21, it is possible to easily seal the hole portions 211.

In the motor unit according to the second embodiment, the motor unit can be made thin by housing portions of the coils 242 in the hole portions 211. Furthermore, in the bearing mechanism utilizing the fluid dynamic pressure, by increasing the length of the bearing mechanism in the direction of the central axis J1, the effective length (or the bearing span) of the radial dynamic pressure bearing portion can be increased to enhance the bearing rigidity in the radial direction. Thus, the motor unit according to the second embodiment is especially suitable to the motor unit including the bearing mechanism utilizing the fluid dynamic pressure.

Third Embodiment

Figure 10:
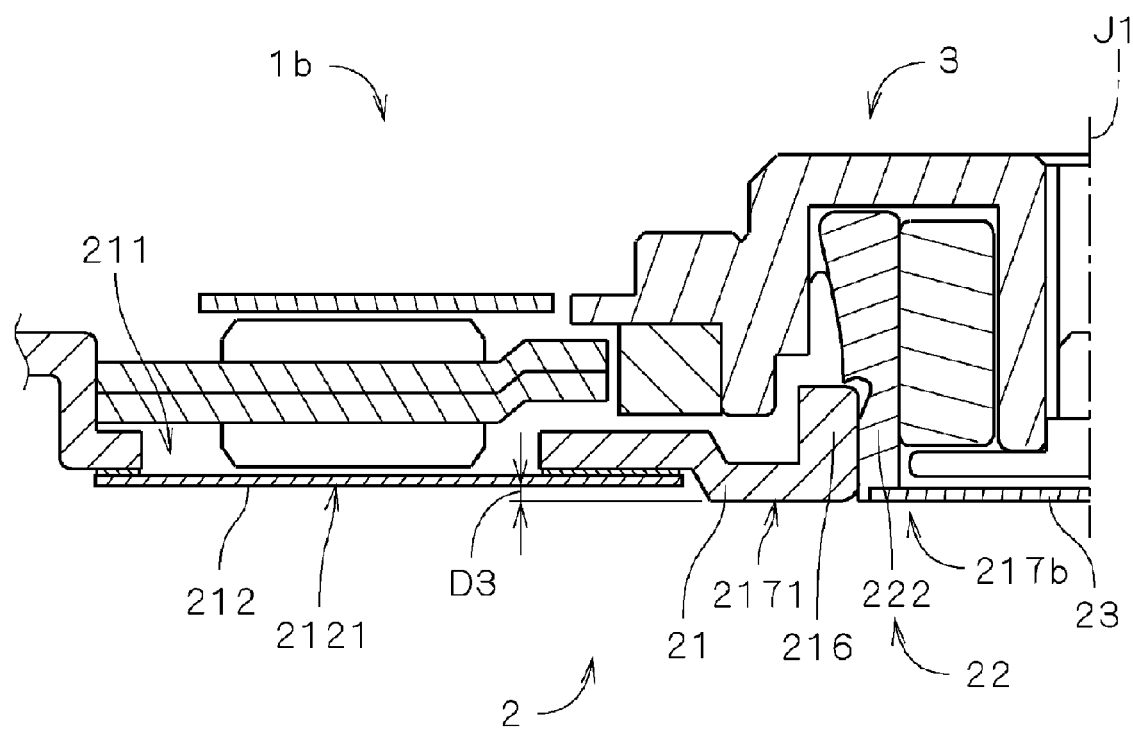
FIG. 10 is an enlarged view showing a portion of a motor according to a third embodiment.

Next, a motor unit according to a third embodiment of the invention will be described. FIG. 10 is an enlarged vertical sectional view of a part of a motor 1b of the motor unit according to the third embodiment. As shown in FIG. 10, a portion of the base plate 21 including a lower end portion of the sleeve mounting portion 216 (i.e., a portion closer to the central axis J1 than an inner edge of the annular sticker member 212), a lower end portion of the sleeve housing 222 of the sleeve unit 22, and the seal cap 23 are a raised portion 217b provided to the lower side of the stationary portion 2.

The raised face 2171 of the raised portion 217b is perpendicular to the central axis J1, formed in a circular shape around the central axis J1, and protrudes lower than the surface 2121 of the sticker member 212 stuck around the raised portion 217b as shown in FIG. 10. A distance D3 for which the raised portion 217b protrudes from the surface 2121 of the sticker member 212 in the direction of the central axis J1 is preferably 10 µm or shorter in the viewpoint of making the motor 1b thin.

In the motor unit according to the third embodiment, a downward load in mounting of the recording disk is supported by the whole raised face 2171 of the raised portion 217b. Therefore, similarly to the first embodiment, deformation of the portion in the vicinity of the sleeve mounting portion 216 in mounting of the recording disk 62 can be suppressed. As a result, the recording disk can be mounted to the motor unit with positional accuracy.

Moreover, similarly to the first embodiment, the sticker member 212 can be easily positioned relative to the base plate 21 using the raised portion 217b as a guide when the sticker member 212 is to be adhered to the base plate 21, to increase productivity of the manufacturing of the motor unit. It is also possible that the raised face 2171 is formed only on the lower end portion of the sleeve housing 222 and the seal cap 23.

Fourth Embodiment

Figure 11:
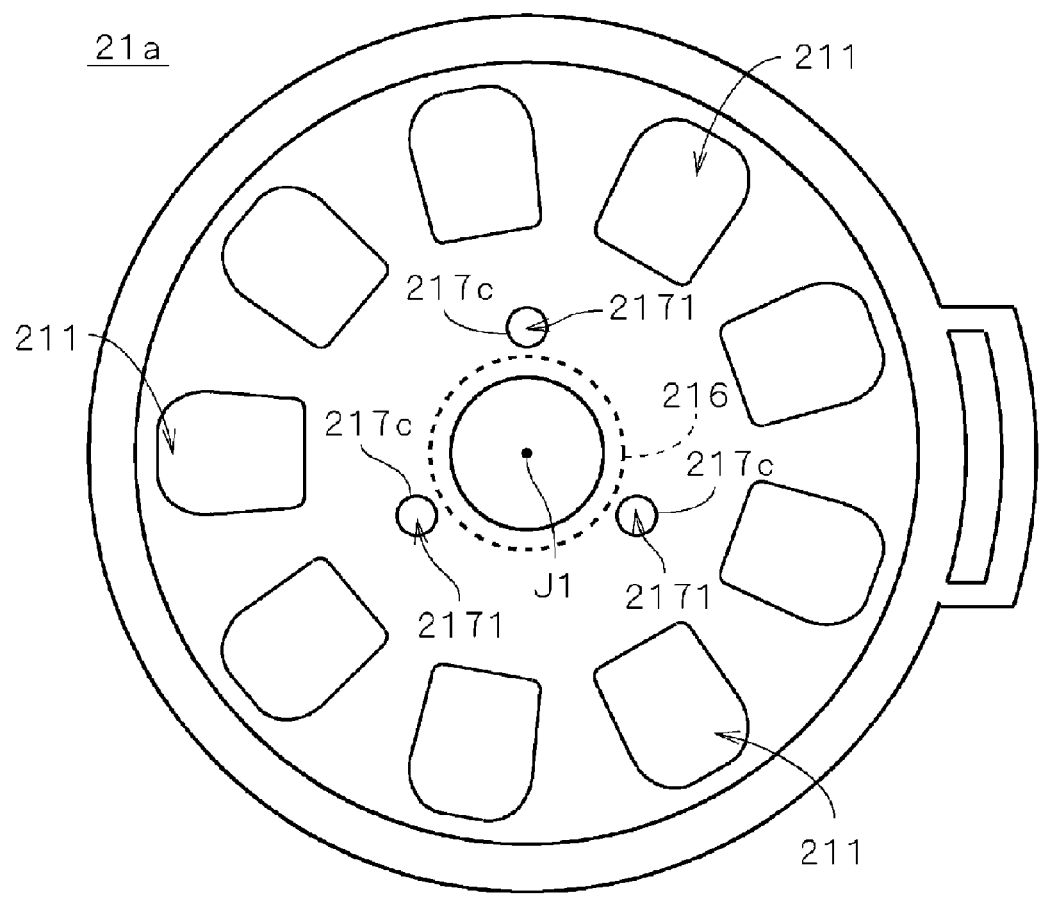
FIG. 11 is a plan view showing a base plate according to a fourth embodiment.

Next, a motor unit according to the fourth embodiment of the invention will be described. FIG. 11 is a bottom view of a base plate 21a of the motor unit according to the fourth embodiment. As shown in FIG. 11, in the motor unit according to the fourth embodiment, three raised portions 217c arranged at substantially equal intervals in a circumferential direction around the central axis J1 are provided in an area between the sleeve mounting portion 216 of the base plate 21a and the plurality of hole portions 211. The raised portions 217c are formed simultaneously with forming of the base plate 21a by presswork.

Three raised faces 2171 of the raised portions 217c are perpendicular to the central axis J1 and arranged at substantially equal intervals in the circumferential direction around the central axis J1. The three raised faces 2171 protrude lower than the surface 2121 (see FIG. 5) of the sticker member 212 stuck around the raised portions 217c. A distance for which the raised portions 217c protrude from the surface 2121 of the sticker member 212 in the direction of the central axis J1 is preferably 10 µm or shorter.

In the motor unit according to the fourth embodiment, a downward load in mounting of the recording disk is supported by the raised faces 2171 of the three raised portions 217c. Therefore, similarly to the first embodiment, deformation of the base plate 21a in the vicinity of the sleeve mounting portion 216 in mounting of the recording disk can be suppressed. As a result, the recording disk can be mounted to the motor unit with positional accuracy.

Moreover, similarly to the first embodiment, when the sticker member 212 is to be stuck to the base plate 21, the sticker member 212 (see FIG. 5) can be easily positioned relative to the base plate 21 using the raised portions 217c as a guide to increase productivity of the manufacturing of the motor unit.

Although the embodiments as examples of the invention have been described above, the invention is not limited to the above embodiments but may be changed in various ways.

In the bearing mechanism of the motor unit according to the above embodiments, the sleeve 221 and the sleeve housing 222 may be formed integrally. The bearing mechanism may utilize a so-called air dynamic pressure bearing using air as fluid, for example. In this case too, similar operation and effects to those of the invention can be obtained. The bearing mechanism does not necessarily have to be one utilizing the fluid dynamic pressure. It may be a ball bearing, for example.

Although a lower portion of one coil 242 is housed in each of the nine hole portions 211 formed in the base plate in the above embodiments, the plurality of coils 242 may be housed in one hole portion 211. For example, three hole portions may be formed in the base plate and lower portions of three coils 242 may be housed in each of the hole portions. In place of the hole portions 211, a recessed portion (e.g., an annular recessed portion around the central axis J1) in which lower portions of the coils 242 are housed may be formed in the base plate.

The sticker member 212 stuck around the raised portion is preferably formed in the annular shape in a viewpoint of easy sticking to the base plate, but the member 212 may be formed in other various shapes as necessary and it is also possible that a plurality of sticker members are stuck around the raised portion.

Figure 12:
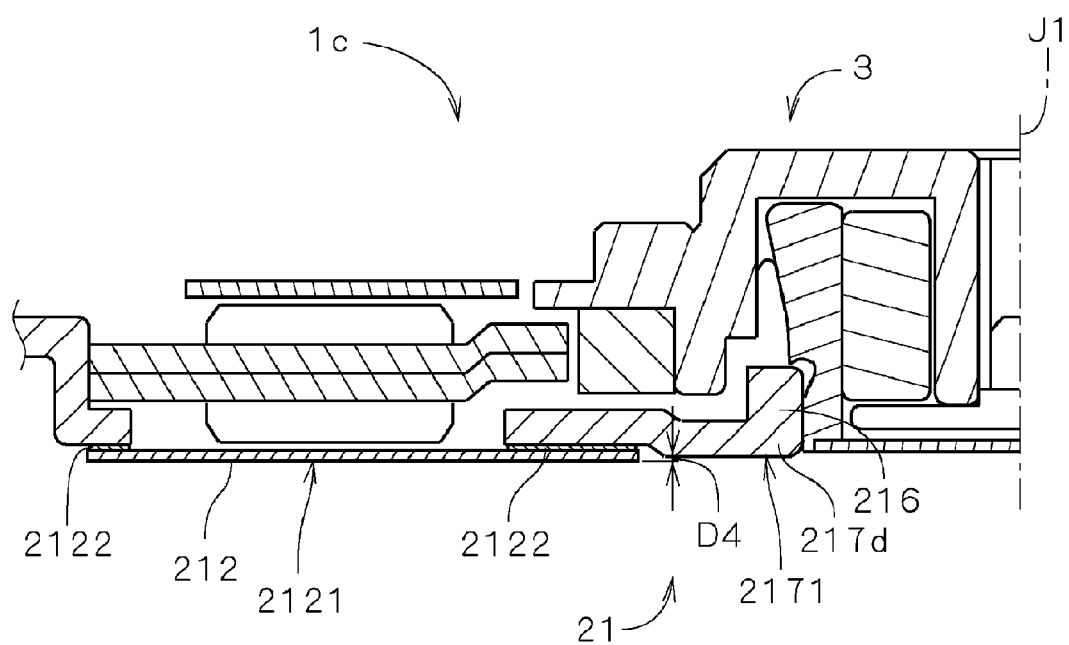
FIG. 12 is a drawing showing another example of the motor.

For the sake of easy positioning of the sticker member 212 when the sticker member is to be adhered to the base plate 21, a raised portion 217d protruding from the surrounding portions at the center of the base plate 21 of the motor 1c may suffice as shown in FIG. 12. The raised face 2171 of the raised portion 217d may be positioned above the surface 2121 of the sticker member 212.

The raised face 2171 may be positioned above the surface of the sticker member 212 in some cases. If a distance D4 between the raised face 2171 and the surface 2121 in the direction of the central axis J1 is sufficiently smaller than a thickness of the tackiness agent layer 2122 between the sticker member 212 and the base plate 21, the tackiness agent layer 2122 is compressed and made thin by the downward load in mounting of the recording disk and the raised face 2171 comes in contact with the placing face of the mounting jig and supports the load. Therefore, deformation of the portion of the base plate 21 in the vicinity of the sleeve mounting portion 216 in mounting of the recording disk can be suppressed.

The raised face 2171 of the raised portion may be composed of any two of the lower face of the portion of the base plate in the vicinity of the sleeve mounting portion 216, the lower face of the sleeve housing 222 of the sleeve unit 22, and the lower face of the seal cap 23.

Figure 13:
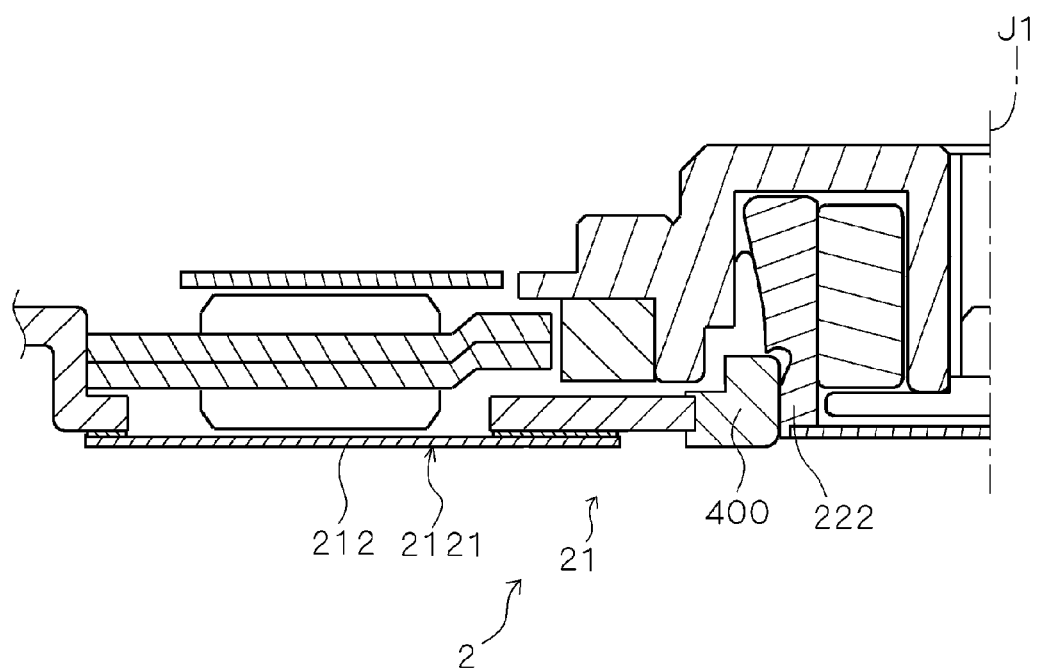
FIG. 13 is a drawing showing another example of the motor.

As shown in FIG. 13, at the central portion of the base plate 21, an annular bushing 400 is provided. The bushing 400 is provided between the base plate 21 and the sleeve housing 222. A lower end portion of the bushing 400 is formed at the same level as or protrudes lower than the lower surface 2121 of the sticker member 212. With the structure in FIG. 13, operation and effects similar to those of the previously described embodiments of the invention can be obtained.

The motor of the motor unit according to the above embodiments does not necessarily have to be of a so-called inner rotor type in which the rotor magnet 34 is disposed on the central axis J1 side of the stator 24 but may be of an outer rotor type in which the rotor magnet 34 is disposed outside the stator 24. It is essential only that the first housing member 611 be at least a part of the housing 61 and the member 611 may be the housing 61 itself, for example.

What is claimed is:

1. A motor unit comprising:
    a motor having a stator, a bearing portion, and a rotor supported by the bearing portion so as to be rotatable around a central axis with respect to the stator, the rotor having a disk supporting portion configured to support a recording disk such that the disk is rotated by the motor; and
    a housing member having an upper side where a recording disk supported by the rotor is housed, and a lower side comprising a sheet member and a base through which a circular opening extends;
    wherein the center of the circular opening in the base is situated on the central axis,
    wherein part of the bearing portion of the motor is received in the circular opening,
    wherein the sheet member has an upper surface and a lower surface, the upper surface of the sheet member being bonded to a lower surface of the base,
    wherein one of the bearing mechanism portion and the housing member has a raised portion located radially inwardly of the sheet member, and
    wherein the raised portion has a lower surface offset, in an axial direction extending along the center axis from the upper side of the housing member toward the lower side, from the lower surface of the sheet member, whereby the raised portion protrudes axially outwardly beyond the lower surface of the sheet member.

2. The motor unit according to claim 1, wherein the base has a substantially cylindrical sleeve mounting portion protruding inwardly in an axial direction opposite to that in which the raised portion protrudes relative to the sheet member, the central longitudinal axis of the sleeve mounting portion being coincident with the central axis about which the rotor is rotatable, and
    wherein part of the bearing mechanism is received in the sleeve mounting portion, an outer peripheral portion of the bearing mechanism comprises a projection, and the projection engages an axially inner end of the sleeve mounting portion.

3. The motor unit according to claim 2, wherein the raised portion constitutes an axially outer end of the sleeve mounting portion.

4. The motor unit according to claim 1, wherein the raised portion protrudes 10 μm or less axially beyond the lower surface of the sheet member.

5. The motor unit according to claim 4, wherein the base has a substantially cylindrical sleeve mounting portion protruding axially inwardly in a direction opposite to that in which the raised portion protrudes relative to the sheet member, the central longitudinal axis of the sleeve mounting portion being coincident with the central axis about which the rotor is rotatable, and wherein part of the bearing mechanism is received in the sleeve mounting portion, an outer peripheral portion of the bearing mechanism comprises a projection, and the projection engages an axially inner end of the sleeve mounting portion.

6. The motor unit according to claim 1, wherein the base comprises a base plate having the central opening therethrough, and the raised portion is a unitary part of the base plate.

7. The motor unit according to claim 1, wherein the stator has a plurality of teeth disposed radially around the central axis, and coils extending around the teeth, respectively; and wherein the base has at least one hole therethrough at a location radially outwardly of the raised portion, part of at least one of the coils is received in the at least one hole, and the at least one hole is covered by the sheet member.

8. The motor unit according to claim 1, wherein the sheet member is annular and extends around the central axis.

9. The motor unit according to claim 1, wherein the base comprises a base plate through which the central opening extends, and the thickness of the base plate is 0.1 mm to 1.5 mm.

10. The motor unit according to claim 1, wherein the raised portion has an annular flat outer surface which extends around the central axis.

11. The motor unit according to claim 1, wherein the raised portion has three or more flat outer surfaces spaced from one another in a circumferential direction around the central axis.

12. The motor unit according to claim 1, wherein the bearing portion constitutes a fluid dynamic pressure bearing.

13. A recording disk driving device comprising:

a motor unit according to claim 1;

an access portion for reading/writing information from/onto a recording disk supported by the rotor of the motor unit; and another housing member forming a housing with the housing member of the motor unit, the motor of the motor unit, and the access portion being housed in the housing.

14. The motor unit according to claim 1, wherein the base comprises a base plate through which the central opening extends and to a lower surface of which the sheet member is stuck, and the sheet member extends over the bottom of the motor unit only within a region located between the raised portion and an outer peripheral portion of the base plate.

15. A motor unit comprising:

a motor having a stator, a bearing portion, and a rotor supported by the bearing portion so as to be rotatable around a central axis with respect to the stator, the rotor having a disk supporting portion configured to support a recording disk such that the disk is rotated by the motor;

a housing member having an upper side where the recording disk supported by the rotor is housed, and a lower side comprising a sheet member and a base through which a circular opening extends, and wherein the center of the circular opening in the base is situated on the central axis, wherein part of the bearing portion of the motor is received in the circular opening, wherein the sheet member has an upper surface and a lower surface, the upper surface of the sheet member being bonded to a lower surface of the base, wherein one of the bearing mechanism portion and the housing member has a raised portion located radially inwardly of the sheet member, and wherein the raised portion has a lower outwardly facing surface that is substantially coplanar with the lower surface of the sheet member.

16. The motor unit according to claim 15, wherein the base has a substantially cylindrical sleeve mounting portion protruding inwardly in an axial direction opposite to that in which the raised portion protrudes relative to the sheet member, the central longitudinal axis of the sleeve mounting portion being coincident with the central axis about which the rotor is rotatable, and wherein part of the bearing mechanism is received in the sleeve mounting portion, an outer peripheral portion of the bearing mechanism comprises a projection, and the projection engages an axially inner end of the sleeve mounting portion.

17. The motor unit according to claim 16, wherein the raised portion constitutes an axially outer end of the sleeve mounting portion.

18. The motor unit according to claim 15, wherein the base comprises a base plate having the central opening therethrough, and the raised portion is a unitary part of the base plate.

19. The motor unit according to claim 15, wherein the stator has a plurality of teeth disposed radially around the central axis, and coils extending around the teeth, respectively; and wherein the base has at least one hole therethrough at a location radially outwardly of the raised portion, part of at least one of the coils is received in the at least one hole, and the at least one hole is covered by the sheet member.

20. The motor unit according to claim 15, wherein the raised portion has an annular flat outer surface which extends around the central axis.

21. The motor unit according to claim 15, wherein the raised portion has three or more flat outer surfaces spaced from one another in a circumferential direction around the central axis.

22. The motor unit according to claim 15, wherein the base comprises a base plate through which the central opening extends and to a lower surface of which the sheet member is stuck, and the sheet member extends over the bottom of the motor unit only within a region located between the raised portion and an outer peripheral portion of the base plate.

* * * * *